6387X

L. Disbrow,

Sectional Steam Boiler.

Patented Feb. 18, 1831.

X

N. PETERS, PHOTO-LITHOGRAPHER, WASHINGTON, D. C.

Patented Feb. 18. 1831 [illegible] 459
6387X

Levi Disbrow of the City & State of New York.
Patented Feb. 18. 1831. Reissued May 6. 1833.
Letters Patent. See Vol. 17. Rest Pats The schedule referred to in these Letters Patent and making part of the same containing a description in the words of the said Levi Disbrow himself of his improvement in the construction of steam boilers, called the combined Furnace Steam boiler; Patented to him on the 18th day of February 1831. which letters Patent being hereby cancelled on account of a defective Specification To all to whom these presents shall come.

Be it known that I Levi Disbrow of the City & State of New York Machi-nist, have invented a new and useful improvement in the construction of Steam boilers. & that the following is a full and exact description of my said improvement called "The Combined furnace Steam Boiler" —

The object of this invention is the advantageous application of coal or other fuel to the purpose of heating water in the boilers of steam engines the water contained in the boilers is heated by means of two or more furnaces of a conical or other form erected within the boiler, having their bases or the grates thro' which the ashes fall upon or near the same level with the floor of the boilers, The smoke or gass is discharged from the furnaces by one or more cylinders passing through the boiler to its outer surface.

Each furnace is replenished with fuel by means of a feeder of cylindrical or other convenient form passing from the outer surface of the boiler thro' the same into each furnace at or near its top.

Each of such feeders is secured by a door (or other means) at the surface of the boiler & fixed to the furnace with a flange or other suitable con-nexion, and the cylinders above mentioned are also secured to each furnace by a suitable flange or connexion.

The said Levi Disbrow claims as his invention the advantageous ap-plication of heat to the boilers of steam engines by means of two or more fur-naces for coal or other fuel erected within the boiler itself & as a part of the same invention, he claims the mode of discharging the gas or smoke of the

[illegible]

6387X fuel by a cylindrical pipe or pipes extending from the surface to the outer surface of the boiler.

Figure 1:
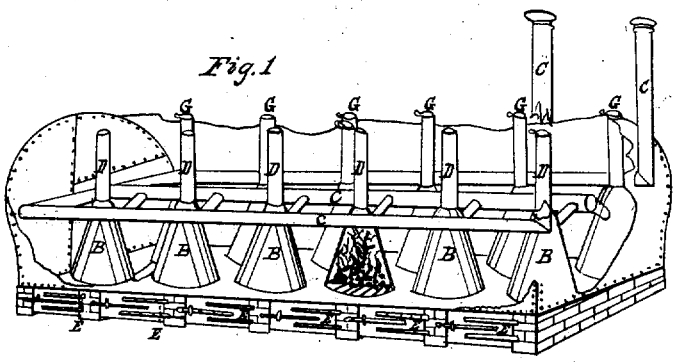
Figure 1:
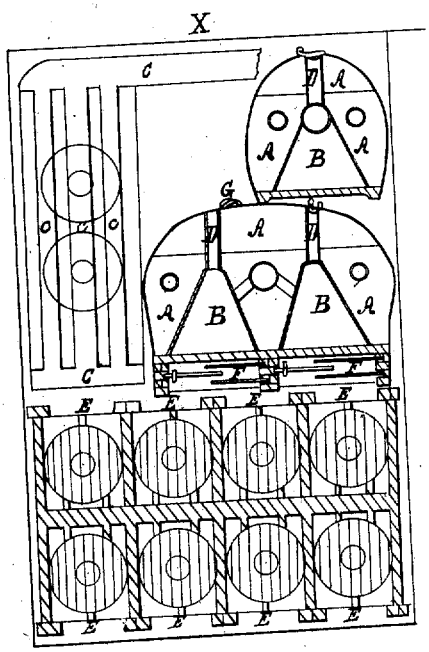

In the annexed plate Fig 1. represents the interior of a boiler supplied with a double range of furnaces B.B. of one of which a vertical section is shown D.D. are feeders with doors at G.G. The grate under each furnace is so arranged as to be emptied at pleasure into the space below to which the doors I.I. open. The smoke from each furnace is discharged thro' small pipes into the larger pipes C.C. which after passing once or more lengthwise thro' the boiler, terminate in one or more chimneys C.C.

Figure 2:
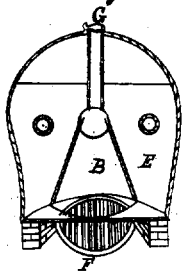

Fig 2 represents the transverse section of a boiler partly filled with water with a single range of furnaces. A marks the space not filled with water B. is the vertical section of a furnace, the grate being dropped to empty the contents of the furnace, D is a feeder with its door at G & C.C.C. are transverse sections of the pipes that discharge the smoke of the furnaces.

Another plate X, is annexed showing a ground plan & transverse section of boilers with a double range of furnaces, a transverse section of one with a single range, & a longitudinal section of the discharging pipes & chimney attached.

Levi Disbrow

Witnesses
Wm Emerson
Geo. H. Morton

720 [illegible]

[illegible]
Ch.[illegible]